United States Patent [19]

Follensbee et al.

[11] Patent Number: 5,155,992
[45] Date of Patent: Oct. 20, 1992

[54] METHOD AND MEANS FOR GENERATING A FORCE

[76] Inventors: Robert E. Follensbee, 13331 Lee Dr., Westminster, Calif. 92683; Guy D. Riva, 378 Fowling St., Playa Del Rey, Calif. 90293

[21] Appl. No.: 520,638

[22] Filed: May 8, 1990

Related U.S. Application Data

[63] Continuation-in-part of Ser. No. 245,441, Sep. 16, 1988, abandoned.

[51] Int. Cl.⁵ .............................................. F02K 11/00
[52] U.S. Cl. .................................... 60/200.1; 60/204; 244/23 C; 244/34 A
[58] Field of Search ...................... 60/200.1, 204, 269; 244/23 C, 34 A

[56] References Cited

U.S. PATENT DOCUMENTS 3,276,723 10/1966 Miller et al. ...................... 244/23 C
3,297,228 1/1967 Hawkins ............................ 244/23 C
3,365,149 1/1968 Willis ................................ 244/23 C
3,612,445 10/1971 Phillips ............................. 244/23 C
3,785,592 1/1974 Kerruish ........................... 244/34 A Primary Examiner—Louis J. Casaregola
Attorney, Agent, or Firm—Robert Louis Finkel

[57] ABSTRACT

A method and means for generating a force. A flared body is enclosed in a shroud to form one or more ducts of axially diminishing cross-section for accelerating and directing the discharge of a fluid introduced into the ducts under pressure. A cambered vane is positioned at the exit of each duct, in the path of the accelerated fluid discharge. Fluid passing over and under each vane produces a force aligned axially with the body and in the direction of flow of the fluid in the associated duct. In a preferred embodiment a conically-shaped body and surrounding shroud form an annular duct for air delivered to the mouth of the duct by a compressor. The vane is an annular airfoil.

7 Claims, 2 Drawing Sheets

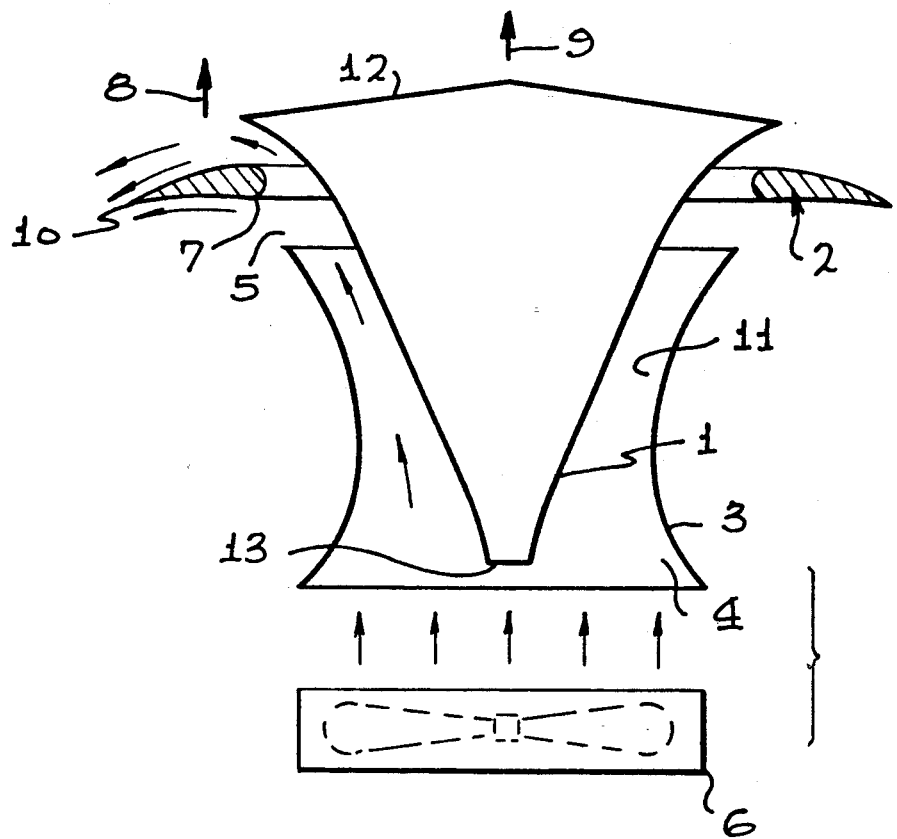
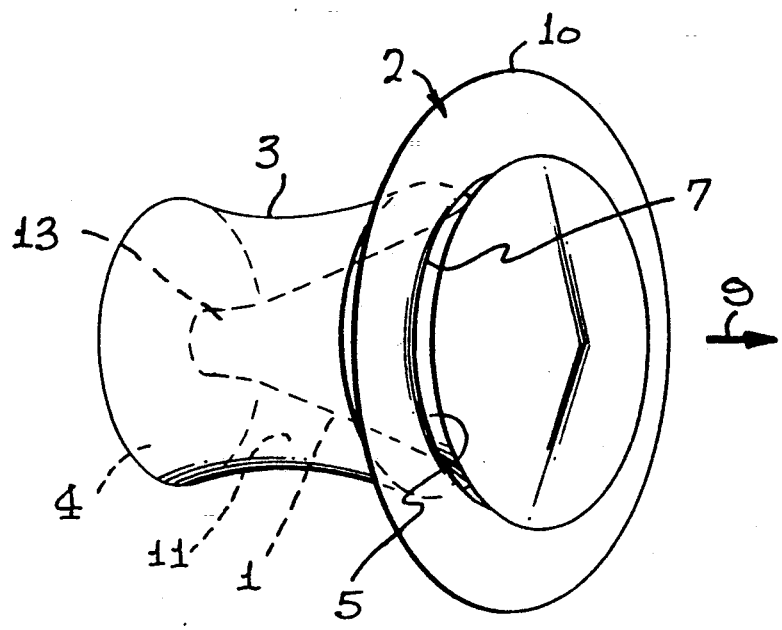

METHOD AND MEANS FOR GENERATING A FORCE

This is a continuation-in-part of U.S. patent application Ser. No. 07/245,441, filed Sep. 16, 1988 and now abandoned.

BACKGROUND OF THE INVENTION

1. Field of the Invention

This invention relates generally to devices for generating force, and in particularly to devices utilizing ducted fluids flowing over airfoil-shaped structures to produce lift, or motion, or power. Still more specifically, it is concerned with methods and means for increasing the efficiency and enhancing the utility of such devices.

2. Description of the Prior Art

In broad terms, the subject invention encompasses a variety of devices which utilize one or more shaped ducts to direct the discharge of a fluid (gas or liquid) under pressure laterally outwardly over a rigid cambered airfoil-shaped lift-producing vane. In its preferred embodiment, the invention employs a generally radially symmetrical annular duct of similar configuration to discharge the fluid flowing through it radially outwardly over an annular cambered vein.

The use of shaped ducts to direct the flow of air or other fluids over wing-like structures is well known. Likewise, the prior art is replete with disclosures of radially symmetrical lift-producing devices with annular ducts discharging the fluid flowing in them in a radially outward direction over annular wing-like structures. However, the subject invention is distinguishable over all of these prior art devices.

SUMMARY OF THE INVENTION

A primary object of the invention is to provide a novel method and means for generating force, power, and motion for a range of applications more efficiently than existing designs.

Another object is to provide a device which can be used to achieve vertical lift in VTOL/STOL AIRCRAFT.

Yet another object is to provide a device which can serve as a propulsion engine where the efficient generation of horizontal force can be usefully applied.

To achieve the aforementioned objects and others which will be apparent from the disclosure which follows, we have employed a novel method and means for increasing the velocity and directing the discharge of force-generating fluid flowing in a duct. Essentially, we have enclosed a flared body in a shroud to form one or more ducts of axially diminishing cross-section for accelerating and directing the discharge of fluid supplied to the ducts under pressure. By "axially diminishing cross-sections", we mean the area at the mouth of each duct (at the narrow end of the body) is substantially greater than the area of the exit or opposite end of the duct (at the enlarged end or base of the flared body). A cambered vane is positioned at the exit of each duct, in the path of the accelerated fluid discharge. The fluid acting on the vane produces a force aligned axially with the body and in the direction of flow of the fluid in the ducts.

In the preferred embodiment of the invention, the flared body is of inverted, generally conical shape and is radially symmetrical about its principal axis. An annular shroud surrounds the body and with it forms an annular duct of axially diminishing cross-section. The converging walls of the duct effectively define a nozzle positioned near the enlarged end of the central body.

An annular vane of cambered shape is mounted to, and spaced from the body near its enlarged end and in the path of fluid discharged radially outwardly of the exit of the duct.

Fluid is accelerated by the nozzle from a relatively low velocity near the duct entrance to a relatively high velocity at the duct exit and impinges upon the curved and pitched vane. A differential fluid pressure between the top and bottom surfaces of the vane results from the difference in the velocity of the fluid flowing over and under the vane. A differential force is created having a major component acting parallel to the longitudinal axis of the conical-shaped body. The magnitude and direction of the force generated by the vane can be controlled by adjusting the profile of the vane and the position and orientation of the vane with respect to the path of the fluid discharged from the annular duct.

The construction and function of the invention and its functions will be better understood from the following detailed description of several of its preferred embodiments as illustrated in the accompanying set of drawings.

DESCRIPTION OF THE DRAWINGS

In the drawings:

FIG. 1 is a schematic side elevational view of a force-generating device embodying the subject invention;

FIG. 2 is a perspective view of the device illustrated in FIG. 1;

DETAILED DESCRIPTION

Figure 3:
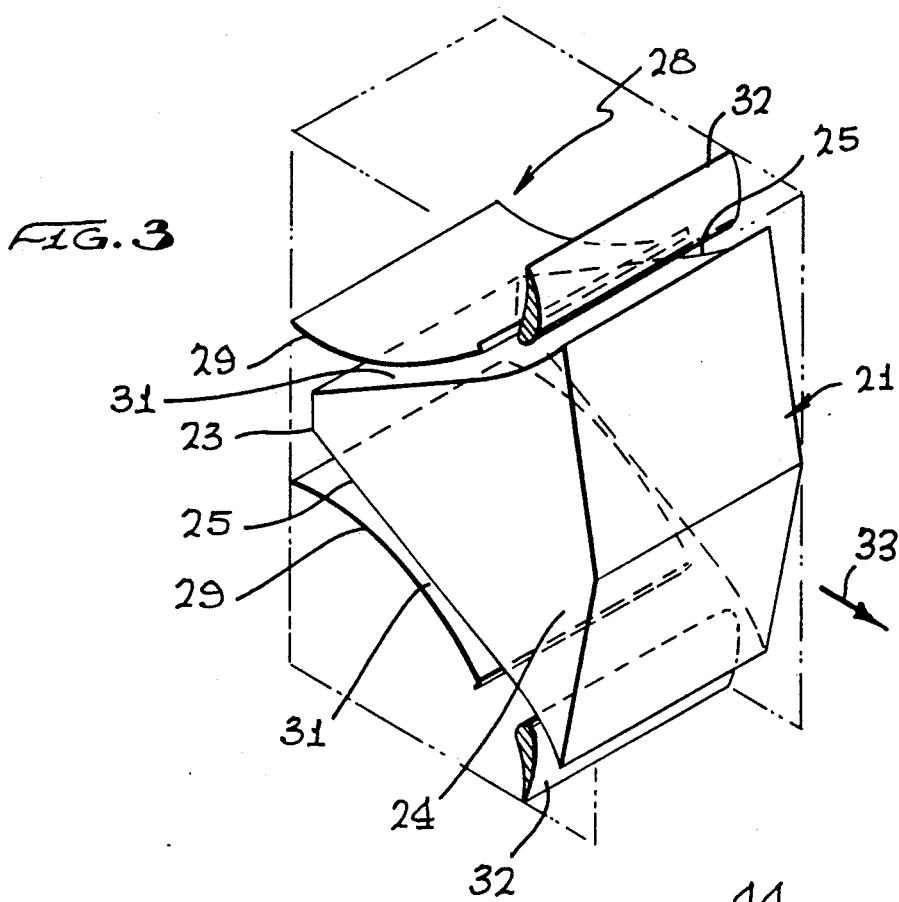
FIG. 3 is a fragmentary perspective view illustrating an alternative embodiment of the invention.

FIG. 1 illustrates, diagrammatically, a device embodying the principles of the subject invention as it might be used to provide the lift required by a VTOL/STOL aircraft. The core of the device is a centrally located inverted generally conically-shaped body 1 having its sides concave and flared radially outwardly around the periphery of its enlarged upper end. An annular vane 2 is spaced radially from and attached (by conventional means not shown) to the central body 1 below the overreaching periphery of its enlarged end. The surface of vane 2 is contoured to present a cambered curvature about vane's chordwise length.

An annular shroud 3 surrounds the lower portion of the body 1, and is configured to form, in conjunction with the generally conical body surface, an upwardly narrowing annular duct 11. The entrance to, or mouth 4, of duct 11 is at the lower end of the device at the narrow end or tip 13 of body 1. The duct exit 5 is at the upper end of shroud 3. The leading edge 7 of vane 2 is positioned in or immediately adjacent the exit 5. As will be explained in detail later, a salient feature of the invention resides in the configuration of duct 11, the relationship between its mouth 4 and its exit 5, and the location and orientation of annular vane 2 with respect to the path of fluid discharged from the exit 5.

Energized fluid, in this instance air, is delivered under pressure from a source, such as compressor 6, connected to the mouth 4 of duct 11. Significantly, while the source of air could be a propellor or ducted fan positioned at or near the mouth 4 of duct 11, for reasons which will be apparent to anyone knowledgeable in the operation of propellers and ducted fans, an alternative source is preferable. Whether the source is mounted to the device or separated from it, as shown in FIG. 1, is of no moment, insofar as the invention is concerned.

As air under compression enters the duct 11, it flows upwardly toward the enlarged upper end of body 1. Since the cross-sectional area of mouth 4 is substantially greater than the cross-sectional area of exit 5, the nozzle defined by the converging walls of duct 11 further accelerates the air entering the duct 11 under pressure but at relatively low velocity and exits the duct 11 with a greatly increased velocity.

The high-velocity discharge is directed to impinge on the leading edge 7 of vane 2 following the curvature of the radially outwardly-flared surface of the body 1. The fluid discharge flows along the top and bottom surfaces of vane 2 in the direction of its trailing edge 10. The greater curvature of the top surface causes an increase in the velocity of the fluid relative to the lower surface and results in a differential between the pressure acting on the upper and lower surfaces. The cumulative effect of this pressure differential results in turn, in the generation of a force represented by the arrow 8. This force 8 is generally symmetrical around the body 1 and is transmitted to body 1 through the vane attachment means (not shown). The resultant force depicted by arrow 9 is the summation of the forces 8 generated by the annular vane.

It should be emphasized that the force generated by the accelerated air passing out of duct 11 and flowing over and under the contoured upper and lower surfaces of vane 2 is not only parallel to, but also oriented in the same direction as the fluid stream in duct 11. This characteristic provides a number of advantages which will be apparent to one skilled in the art.

In FIG. 2, the device of FIG. 1 is shown oriented horizontally rather than vertically. In all respects the operation of the device in FIG. 2 is identical with that in FIG. 1 save that the aggregate resultant force 9 is directed horizontally, rather than vertically upward.

In the embodiment of FIG. 3, a body 21 having a narrow end 23 and an enlarged end 24 is formed with opposed axially outwardly-flaring sides 25. A shroud 28 includes side walls 29 coextensive with at least a portion of sides 25 of body 21. It will be understood that for purposes of illustration, only a small section of body 21 and shroud 28 is shown. Shroud 28 may fully encircle the ends of body 21, the space between sides 25 and walls 29 may be sealed at the ends of body 21 and shroud 28 to prevent the loss of air, or the spaces between the sides 25 of body 21 and shroud 28 may be left open. The choice is not within the scope of the subject invention.

Shroud 28 and the sides 25 of body 21 form a converging duct 31 on either side of body 21. A cambered vane 32 is mounted by conventional means (not shown) to body 21, and is positioned and oriented to produce lift under the influence of fluid, such as air or water, entering the duct 31 at its mouth adjacent tapered end 23 of body 21 and exiting duct 11 in the region adjacent the enlarged end 24 of body 21. The cumulative result of the lift forces generated by vanes 32 is depicted by the arrow 33. Although the body 21 and shroud 28 are not radially symmetrical and the vanes 32 are not annular, the operation and result achieved by this embodiment of the invention are substantially identical with those previously described in connection with the embodiments of FIGS. 1 and 2.

Figure 4:
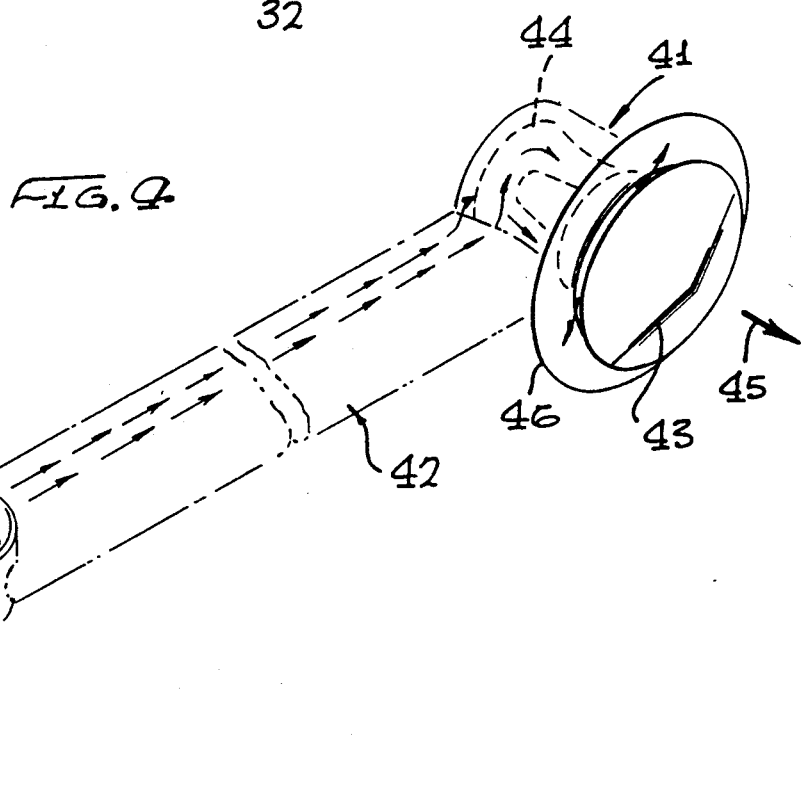
FIG. 4 is a fragmentary perspective view illustrating another embodiment of the invention.

In the embodiment of FIG. 4, a force-generating device 41 similar to the devices illustrated in FIGS. 1 and 2 is mounted to the end of a pivotal arm, such as helicopter rotor blade 42. Energized fluid, preferably air, is pumped from a remote compressor carried by the helicopter through more or less conventional ducting (not elaborated) to the mouth of the annular duct 42 formed by conically shaped central body 43 and its encircling shroud 44. The cumulative force 45 generated by the lift produced through the interaction of the accelerated air discharged from the constricted duct 42 with annular vane 46 serves to propel rotor 42 in its circular path, thereby providing the lift required to operate the helicopter.

Although the conically-shaped sides of the radially symmetrical body 1 and the sides 25 of the bilaterally symmetrical body 21 are shown as slightly concave throughout their middle sections, it should be understood that the subject invention contemplates a variety of surface shapes, from concave to convex and any combination of concave and convex curvature, so long as the cross-sectional area of each duct is larger at the mouth of the duct than the area of its exit. The chief characteristics of each duct are its ability to increase the velocity of fluid passing through the duct, and its ability to direct the discharge of the accelerated fluid to enhance the interaction of the fluid with its associated airfoil-like vane.

While we have described our invention in terms of several preferred embodiments, it is not to be construed as limited to those embodiments. They are to be regarded as illustrative rather than restrictive. We intend by this specification to cover any and all variations of the examples chosen for purposes of the disclosure, which do not depart the spirit and scope of the following claims.

We claim:

1. A device for generating a force, comprising:
a body having a narrow end and an enlarged end and opposed, longitudinally outwardly-flaring sides;
a shroud mounted to said body and coextensive with at least a portion of each of said sides, said shroud and the sides of said body forming one or more longitudinally outwardly-flaring ducts directing the discharge of a stream of fluid flowing therein outwardly of said body, the cross-sectional area of the mouth of each duct at the narrow end of said body being greater than the cross-sectional area of the exit of said duct at the enlarged end of said body whereby each duct defines a nozzle accelerating said stream of fluid flowing therein;
compressor means effectively connected to the mouth of each duct for forcing a stream of fluid to flow through each said duct; and
a vane mounted to said body adjacent the exit of each duct and in the path of the stream of fluid flowing from the exit of said duct, said vane being cambered toward the enlarged end of said body whereby the accelerated fluid acting on said vane generates a force substantially longitudinal of said body and directed toward the enlarged end of said body.

2. A device for generating a force, comprising:
a generally conically-shaped body having a narrow end and an enlarged end and an axially outwardly-flaring side;

an annular shroud mounted to said body concentric with and encircling at least a portion of said body, said shroud with the side of said body forming an annular axially outwardly-flaring duct directing the discharge of a stream of fluid flowing therein radially outwardly of said body, the cross-sectional area of the mouth of said duct at the narrow end of said body being greater than the cross-sectional area of the exit of the duct at the enlarged end of said body, whereby said duct defines a nozzle accelerating said stream of fluid flowing therein;

compressor means for forcing a stream of fluid to flow through said duct; and a generally annular vane concentrically mounted to said body adjacent the exit of said duct and in the path of the stream of fluid flowing from the exit of said duct, said vane being cambered toward the enlarged end of said body whereby the fluid acting on said vane generates a force generally coaxial with and directed toward the enlarged end of said body.

3. The device of claim 2, wherein said fluid is air, and said vane is an airfoil.

4. A method for generating a force, comprising:

providing a body having a narrow end, an enlarged end and an axially outwardly-flaring side;

enclosing a portion of the side said body in a shroud, said shroud and the side of said body forming a duct directing the discharge of a stream of fluid flowing therein laterally outwardly of said body, the cross-sectional area of the mouth of said duct at the narrow end of said body being greater than the cross-sectional area of the exit of said duct at the enlarged end of said body, whereby said duct defines a nozzle accelerating a stream of fluid flowing therein;

effectively connecting to the mouth of said duct compressor means for forcing a stream of fluid to flow through said duct; and mounting a vane to said body adjacent the exit of said duct and in the path of the stream of fluid flowing from said duct, said vane being cambered toward the enlarged end of said body whereby the accelerated fluid acting on said vane generates a force substantially longitudinal, of said body and directed toward the enlarged end of said body.

5. The device of claim 1, wherein said fluid is air, and said vane is an airfoil.

6. A vehicle having thrust-generating means comprising:

a body having a narrow end and an enlarged end and opposed, longitudinally outwardly-flaring sides;

a shroud mounted to said body and coextensive with at least a portion of each of said sides, said shroud and the sides of said body forming one or more longitudinally outwardly-flaring ducts directing the discharge of a stream of fluid flowing therein outwardly of said body, the cross-sectional area of the mouth of each duct at the narrow end of said body being greater than the cross-sectional area of the exit of said duct at the enlarged end of said body whereby each duct defines a nozzle accelerating said stream of fluid flowing therein;

compressor means effectively connected to the mouth of each duct for forcing a stream of fluid to flow through each said duct; and a vane mounted to said body adjacent the exit of each duct and in the path of the stream of fluid flowing from the exit of said duct, said vane being cambered toward the enlarged end of said body whereby the accelerated fluid acting on said vane generating a force substantially longitudinal of said body and directed toward the enlarged end of said body.

7. The vehicle of claim 6, wherein:

said body is generally conically-shaped and the side thereof is flared axially outwardly;

said shroud is generally annular and concentric with said body, and said duct is annular and flared axially outwardly of said body, whereby the stream of fluid flowing therein is discharged from said exit radially outwardly of said body; and said vane is annular and is mounted concentrically with said body adjacent the exit of said annular duct, whereby the force generated by the fluid acting on said vane is generally coaxial with said body.

* * * * *

UNITED STATES PATENT AND TRADEMARK OFFICE
CERTIFICATE OF CORRECTION

PATENT NO. : 5,155,992

DATED : October 20, 1992

INVENTOR(S) : Robert E. Follensbee et al

It is certified that error appears in the above-identified patent and that said Letters Patent is hereby corrected as shown below:

On the title page Item (76), second Inventor, "Guy D. Riva" should read -- Guy Dalla Riva --.

Signed and Sealed this

Sixteenth Day of November, 1993

Attest:

BRUCE LEHMAN

Attesting Officer

Commissioner of Patents and Trademarks